(12) United States Patent
Chang

(10) Patent No.: US 6,194,840 B1
(45) Date of Patent: Feb. 27, 2001

(54) SELF-OSCILLATING RESONANT CONVERTER WITH PASSIVE FILTER REGULATOR

(75) Inventor: Chin Chang, Yorktown Heights, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/221,954

(22) Filed: Dec. 28, 1998

(51) Int. Cl.[7] ...................................... H05B 37/02
(52) U.S. Cl. .................. 315/209 R; 315/194; 315/276; 315/224; 315/244; 315/DIG. 7
(58) Field of Search ...................... 315/209 R, 219, 315/227 R, 232, 238, 224, 244, 239, DIG. 4, DIG. 5, DIG. 7, 307, 291, 276, 194

(56) References Cited

U.S. PATENT DOCUMENTS

| | | | |
|---|---|---|---|
| 4,920,302 | * | 4/1990 | Konopka ............................. 315/307 |
| 5,329,209 | * | 7/1994 | Nepote ............................. 315/209 R |
| 5,349,270 | | 9/1994 | Roll et al. ............................. 315/209 |
| 5,371,668 | * | 12/1994 | Gurwicz et al. ............. 315/209 R X |
| 5,404,082 | * | 4/1995 | Hernandez et al. .................. 315/219 |
| 5,410,221 | * | 4/1995 | Mattas et al. ......................... 315/307 |
| 5,422,546 | * | 6/1995 | Nilssen ................................. 315/219 |
| 5,424,614 | * | 6/1995 | Maheshwari ..................... 315/209 R |
| 5,436,529 | * | 7/1995 | Bobel ................................... 315/127 |
| 5,438,243 | * | 8/1995 | Kong ................................... 315/219 |

* cited by examiner

Primary Examiner—Haissa Philogene
(74) Attorney, Agent, or Firm—Bernard Franzblau

(57) ABSTRACT

An electronic fluorescent lamp ballast having output voltage stabilized by a bandpass filter connected between a transformer control winding and the switching electrode of the switching transistor. In one embodiment especially adapted for ballasts which power multiple lamps, the filter causes oscillation frequency to vary with the number of lamps lit in such a way that output (lamp) voltage remains relatively constant. A filter for this application preferably includes a low-Q tank circuit in the series path of a $\pi$ section, and has an input high pass T section. In another embodiment, a low cost electronic ballast having power feedback uses passive bandpass filters between transformer control windings and the control electrodes, so as to simplify the control and driver circuitry.

27 Claims, 6 Drawing Sheets

SELF-OSCILLATING RESONANT CONVERTER WITH PASSIVE FILTER REGULATOR

CROSS-REFERENCE TO RELATED APPLICATIONS

Not Applicable.

STATEMENT REGARDING FEDERALLY SPONSORED RESEARCH OR DEVELOPMENT

Not Applicable

BACKGROUND OF THE INVENTION

This invention relates to electronic ballasts for operating discharge lamps such as fluorescent lamps, and in particular to such ballasts having a minimum number of active components.

Most magnetically coupled self-oscillating inverters are manufactured in large quantities for sale in a highly competitive market. Half-bridge inverters generally have a lower cost because of a reduced parts count. Such inverters may be classified into two groups: those using a current transformer having a saturable core, generally together with power BJT's (bipolar junction transistors); and those using a current transformer having a linear core, generally together with MOSFETs (metal oxide semiconductor field effect transistors). As those of ordinary skill will recognize, in this context a linear core is one in which operation is over a region having a curved B-H characteristic, rather than a sharp B-H characteristic; that is, at all times the flux level is such that a significant increase in magnetizing current will be accompanied by a significant increase in flux level.

U.S. Pat. No. 5,349,270 discloses a MOSFET half-bridge ballast which has auxiliary windings coupled to a series resonance inductor which is connected between the load and the inverter output at the node between the two switching transistors. The load, a single 20 w fluorescent lamp, is in series with a 220 nf capacitor, and 10 and 15 nf capacitors are in a starting circuit in parallel with the lamp. These capacitors form a resonant circuit with the inductor. As a result, the signals provided by the auxiliary windings are proportional to the inverter output current. Each of the auxiliary windings is connected to a low-pass phase shifting circuit whose output provides a control signal to the gate electrode of the respective MOSFET. It will be clear to those of ordinary skill in the lamp ballast art that, if this ballast were applied to a multiple lamp fixture, removal of one lamp while the ballast was operating would cause a great change in the output voltage applied to the remaining lamp(s). The simple low-pass filter structure is not able to accommodate the proper frequency changes when the lamp number is changed.

BRIEF SUMMARY OF THE INVENTION

An object of the invention is to provide a low cost electronic lamp ballast whose output voltage remains substantially constant if the lamp, or all lamps, are removed.

Another object of the invention is to provide a low cost electronic lamp ballast which can operate one, two, three or four lamps with substantially the same output voltage.

A further object of the invention is to provide an electronic lamp ballast having an all passive component regulating circuit containing only passive components, yet permitting broad frequency variation.

According to the invention, a half-bridge converter for operating a plurality of discharge lamps includes two switching transistors having an output node between them, and a linear core transformer having a load winding through which load current passes, the load winding and the load being in series with one end of the series connection connected to the output node. The transformer includes at least one control winding, and the converter has an open loop regulation circuit, including a passive bandpass filter connected between the control winding and the control terminal of one of the switching transistors, for varying the oscillating frequency to maintain the output voltage constant.

A first embodiment of the invention offers the advantage that the output voltage remains constant even if the lamp, or one or more of multiple lamps, are extinguished or removed. The transformer has two control windings, each connected to a respective bandpass filter for controlling the gate of a respective MOSFET. To permit operation with anywhere from one to four lamps operating from the same ballast, the bandpass filter should have a substantially constant phase shift over a wide range of frequency, such as a ratio of 1:2. The desired value of phase shift is determined by other parameters of the converter circuit, especially those relating to the resonance of the load circuit and the circuitry which guarantees adequate ignition voltage for each discharge lamp. A variation of phase shift over a range of only 10°, such as within 5° of a median value, may be required, while the desired median value may be as low as 25° or as high as 65°. If the range of the number of lamps which will be lit is small, such as only 3 or 4 out of 4, then the required frequency range may be as low as approximately 5:6. Other combinations of lamps, such as 2 or 3 out of 3, or different circuitry arrangements, may require relatively constant phase shift over a broader frequency range of 4:5, and even 1 to 4 out of 4 may only require a range of 3:5.

The requirement for constancy of phase shift may also vary, and may in some circumstances permit the phase shift to vary over a range of approximately 20° in value. At the same time, the filter gain variation may interact with the phase shift variation requirement, and in commercially practicable converters the constancy of output voltage will usually be specified more narrowly if frequency variation is not great, such as 4:5, where only 8% total voltge range is permitted; while for a broader variation in numbers of lamps requiring frequency variation of 3:5 the acceptable range of output voltage may be 9% or 10%.

According to one preferred embodiment of the invention, which can operate between one and four lamps, the desired phase shift is between approximately 45° and approximately 55°, preferably about 50° over frequencies from 42 to 70 kHz. These filters are preferably pure AC bandpass filters utilizing only linear passive elements.

A filter providing good performance in this embodiment, for up to four discharge lamps, has at least one π section including an inductive element which is part of a low-Q parallel resonant circuit in the series or forward path of the filter, and at least one capacitor in the legs to signal ground.

In another embodiment of the invention, the converter is a low cost single stage electronic ballast based on the power feedback principle, having a power feedback path from the high frequency lamp circuit to the input DC voltage to the inverter, and having bandpass filters connected between control windings and gates of respective MOSFETs. The control windings are part of a transformer whose primary winding functions as a resonant inductor for the ballast load circuit. The bandpass filters are pure RC filters having a transfer characteristic with approximately constant attenuation and a phase shift constant within approximately 15°, over a frequency range greater than 2:3.

DETAILED DESCRIPTION OF THE INVENTION

Figure 1:
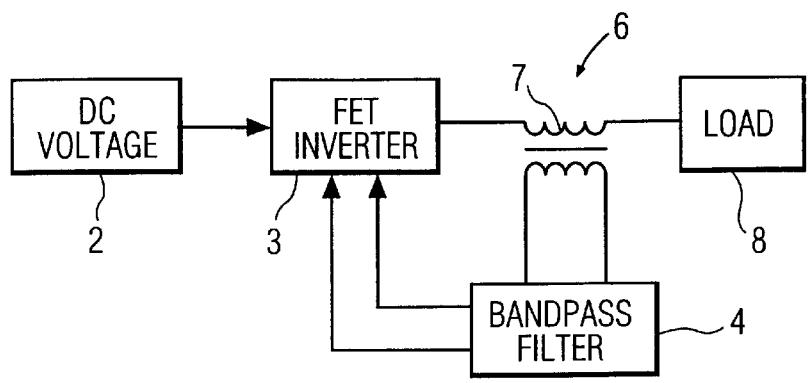
FIG. 1 is a simplified block diagram of a converter according to the invention.

The simplified block diagram of the FIG. 1 exemplifies the underlying concept of the invention. A DC voltage supply 2, which is of any common type but will usually be a bridge rectifier or a voltage doubler supply, or a boost type converter, connected to an AC supply, provides a high DC voltage to an FET inverter 3. Switching of the FETs is controlled by bandpass filters 4 which are connected to a control winding or windings of a linear core inductor 6. The inductor 6 has both a primary or load winding 7 which, together with at least one capacitor in the load circuit 8, forms a resonant circuit, but also like a transformer has a sensing or control winding which provides a voltage signal which, because of the close coupling of the transformer core and structure, is proportional to the inductor voltage.

In the generalized circuit of this diagram, it is assumed that the bandpass filters do not place a significant load on the transformer, so that the resonant character of the load on the inverter is not affected.

Figure 2:
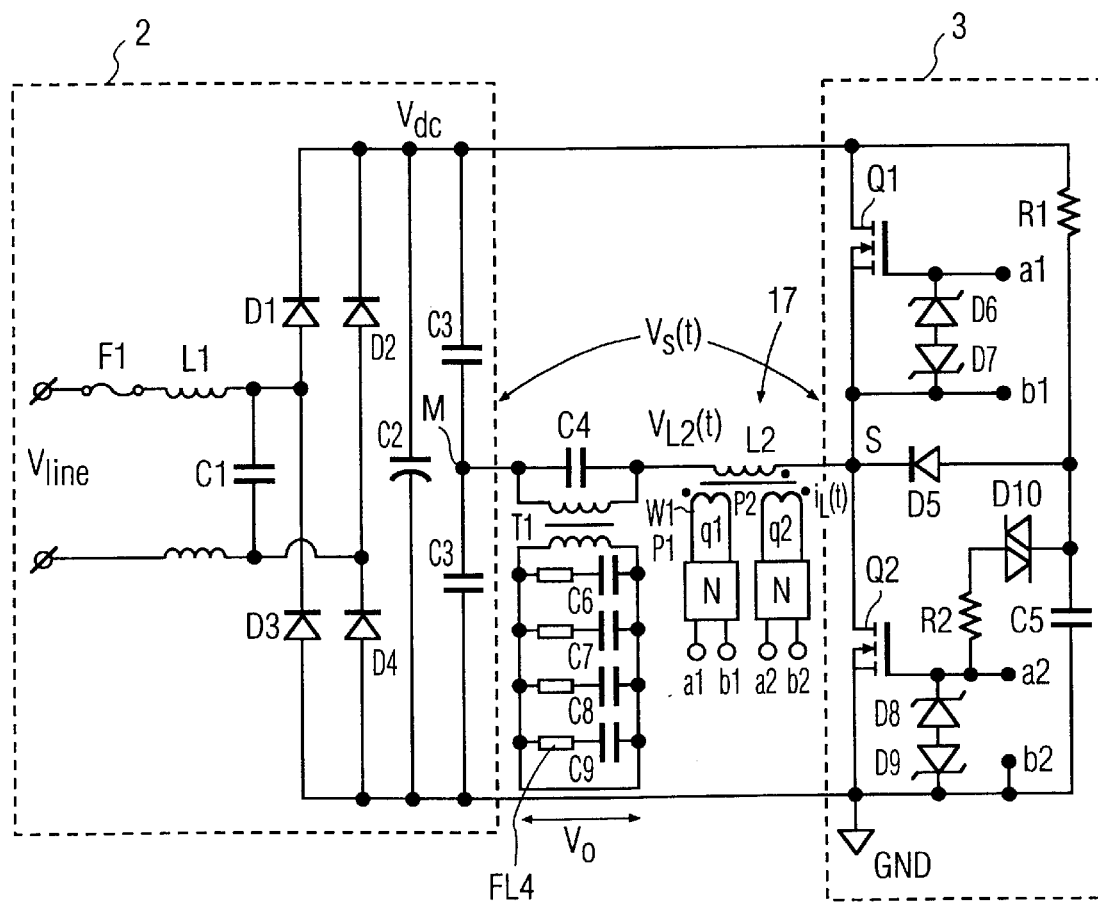
FIG. 2 is a schematic diagram of a converter embodying the invention.

A practical embodiment of the FIG. 1 converter is shown in FIG. 2. The DC supply 2 is a well-known full wave rectifier design. The AC line voltage is applied, through a fuse F1 and an EMI filter formed by series inductances L1 and shunt capacitor C1, to a full wave bridge formed by diodes D1–4. The rectifier bridge provides an output $V_{dc}$ with respect to signal ground across an electrolytic capacitor C2 and a series combination of capacitors C3, which have a midpoint node M to which one end of the load circuit is connected.

The inverter 3 includes two MOSFETs Q1 and Q2 connected in series between the $V_{dc}$ bus and signal ground, and have a midpoint node S providing the inverter output. A conventional inverter starting circuit is formed by a series resistor RI and capacitor C5 connected from the $V_{dc}$ bus to signal ground. The midpoint of the series combination is connected to the node S through a diode D5, and to the gate of switching transistor Q2 through a diac D10 and resistor R2. A protective zener diode pair D6–7 and D8–9 is connected between each switching transistor gate and its source electrode. Connection points a1, b1 and a2, b2 are shown for the gate signals to be provided to the inverter through bandpass filters N to be described below with respect to FIG. 6.

A resonant load circuit is connected between nodes S and M. The primary winding L2 of a linear core transformer 17 functions as an inductance in series with a resonance capacitor C4 and the capacitances associated with the lamp circuit. The lamp circuit includes a step-up transformer T1 having a primary across the capacitor C4, and a secondary to which fluorescent lamps FL1–4 are connected, each lamp being in series with a respective capacitor C6–9. The capacitors C6–9 are chosen to have an impedance far greater than the lamp impedance over the operating range of inverter frequency. The resonant circuit parameters and the transformer T1 turns ratio for the components values of Table 1 are chosen to provide a secondary winding voltage which has a nominal value of 580 vAC. As a result, no special lamp starting circuits are required because this voltage is sufficient to strike an arc in an unlit lamp, and there is no need for a special order of starting for the lamps.

In this embodiment of the invention the control winding function is provided by identical auxiliary windings W1 and W2 on the resonant transformer 17, having connections p1, q1 and p2, q2 for the bandpass filters N.

Figure 3:
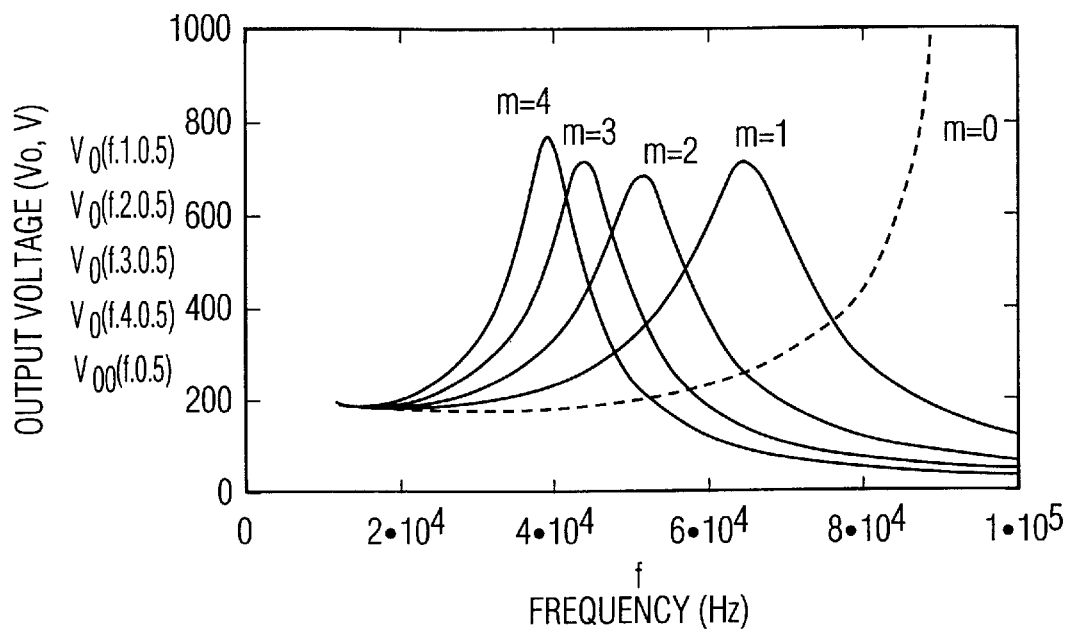
FIG. 3 is a graph of output voltage versus inverter frequency for the embodiment of FIG. 2 for different numbers of lamps.
Figure 4:
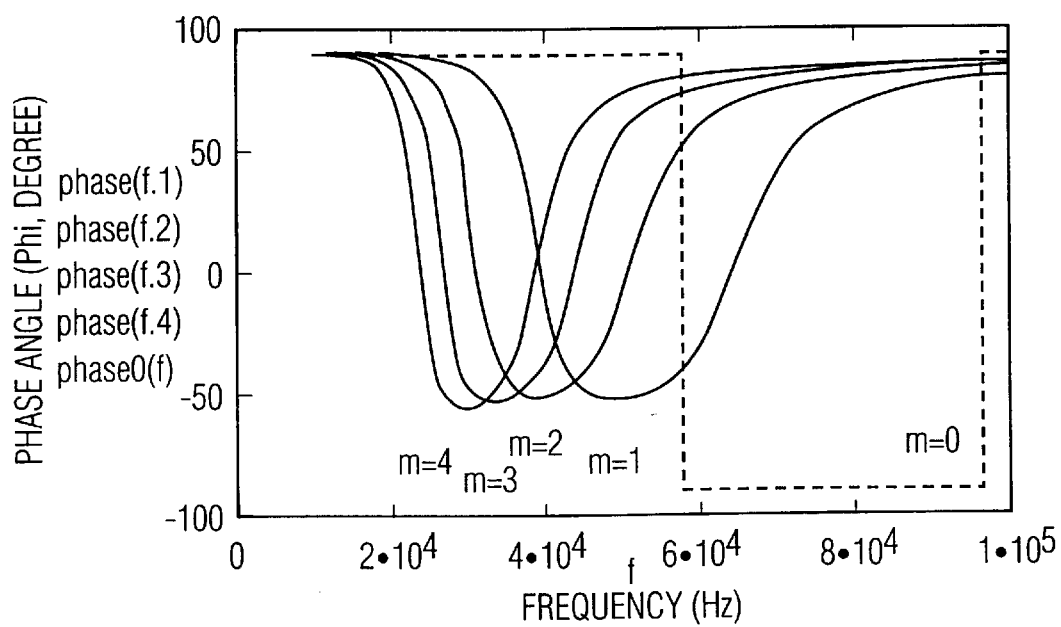
FIG. 4 is a graph of resonant tank input phase versus inverter frequency for the embodiment of FIG. 2 for different numbers of lamps.

It is well-known that the output voltage applied to the lamps will change if the inverter frequency changes, and the curve of output voltage versus frequency is a function of the number of lamps lit. FIG. 3 is a graph of output voltage versus inverter frequency of the FIG. 2 converter for m lamps, where m is an integer from 0 to 4, and the converter has nominal element values given in Table 1. These curves show that, before a first lamp has ignited, a high oscillation frequency is required. It is also known that, for a stable self-oscillating inverter, according to the Barkhausen criterion a specific lagging phase angle of ψ degrees is required between the voltage across the inductor formed by the primary winding L2 of transformer 17 and the switching transistor gate connection points. FIG. 4 is a graph of the resonant tank input phase angle φ versus frequency for the same numbers of lamps. The angle ψ, where ψ=90°−φ, changes slightly as a function of the number m of lamps lit, but as shown in FIG. 5 for the circuit of FIG. 2, the values of ψ for a desired output voltage of 560 volts are all about 50°.

Figure 5:
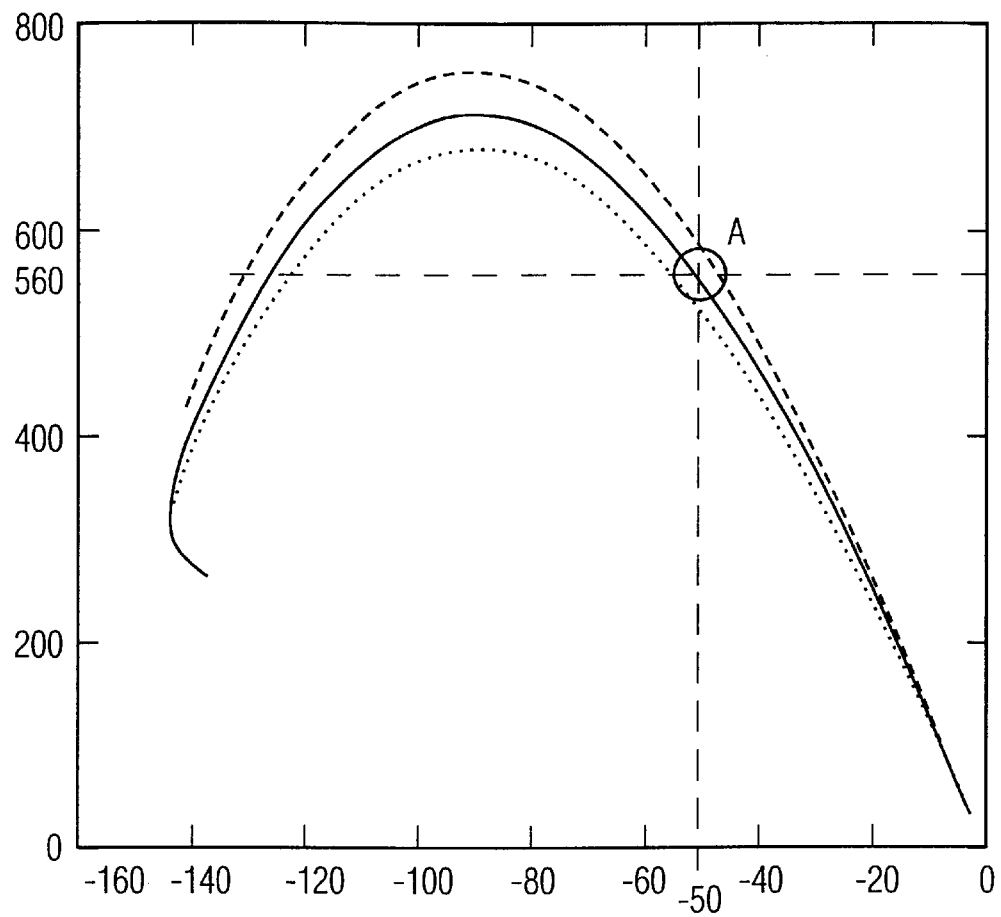
FIG. 5 is a graph of output voltage versus needed filter phase angle lag for the embodiment of FIG. 2 for different numbers of lamps.

Comparing FIGS. 3 and 5, it is clear that a constant output voltage of approximately 560 v, with operation at frequencies above resonance, requires that the angle ψ should be approximately constant for frequencies between approximately 42 kHz and 70 kHz. The bandpass filters N are designed to provide such a phase shift between the resonant inductor voltage and the switching transistor gate connection points a1, b1 and a2, b2.

Figure 6:
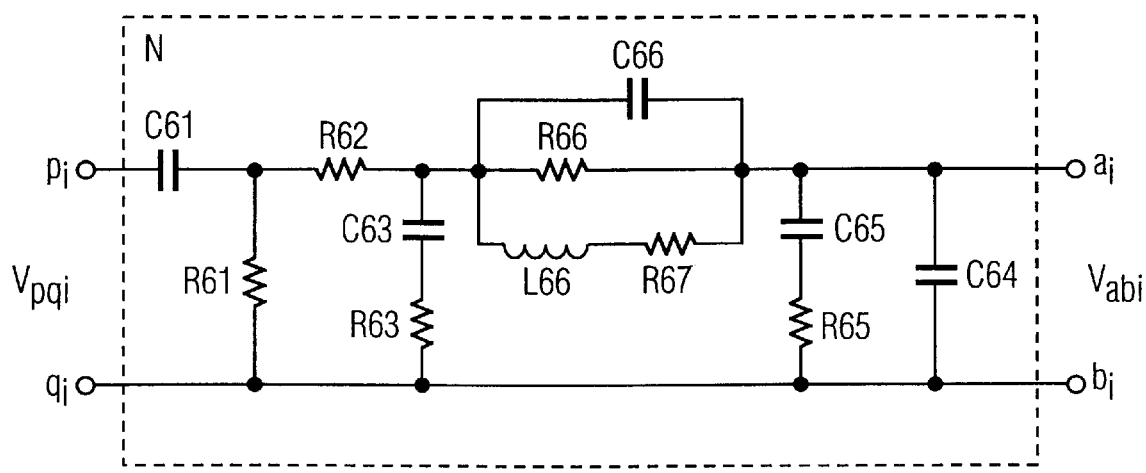
FIG. 6 is a schematic diagram of a filter useful in the embodiment of FIG. 2.

A passive bandpass filter having the desired characteristics is shown in FIG. 6. It has a series input capacitor C61, a first shunt element formed by resistor R61, and a second series element formed by resistor R62. A second shunt element is formed by a series combination of capacitor C63 and resistor R63, and a third, output shunt element is formed by capacitor C64 in parallel with a series combination of resistor R65 and capacitor C65. The second and third shunt elements are connected by a third series element formed by a low-Q resonant circuit formed by a series capacitor C66 in parallel with a resistor R66 and a series combination of inductor L66 and resistor R67.

If the total filter circuit described above is analyzed with respect to the element values given in Table 1, it will be seen that this filter may be thought of as having an input T section in cascade with a π section. Over the frequency range of interest, the T section has an approximately constant gain, with a leading phase angle which diminishes as frequency rises. The critical shaping of the frequency versus phase curve is determined primarily by the π section, which contains the inductive element in a low-Q resonant circuit.

It should be pointed out that the high gate impedance of MOSFETs is an important factor in the performance of the filter. If the switching transistors draw significant control electrode current, they will load down the filter and change its characteristics.

Figure 7:
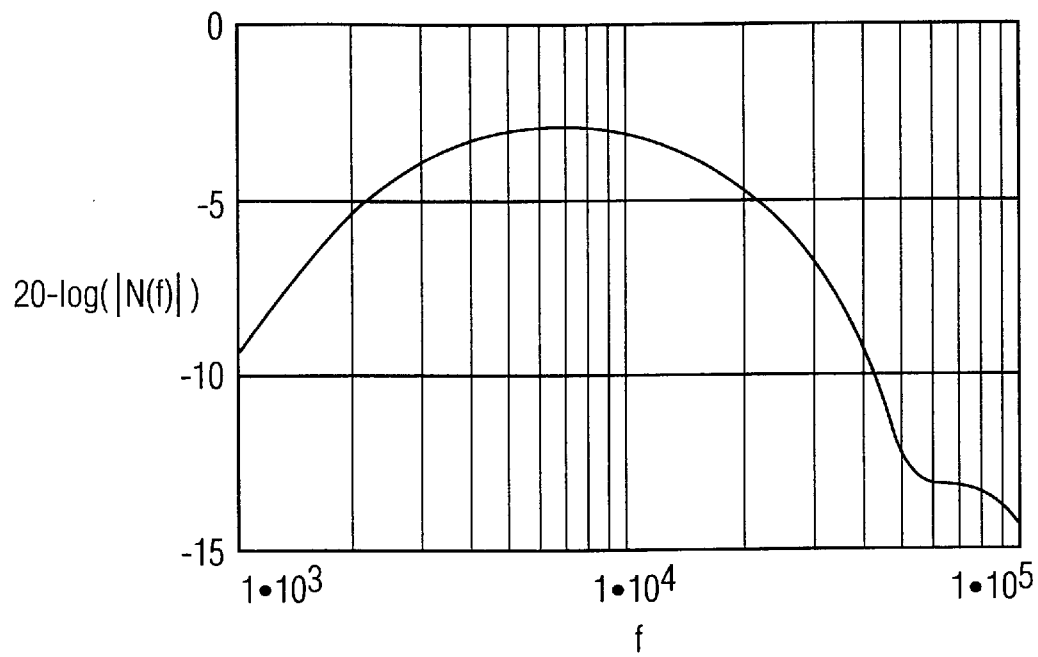
FIG. 7 is a graph of gain versus frequency for the filter of FIG. 6.
Figure 8:
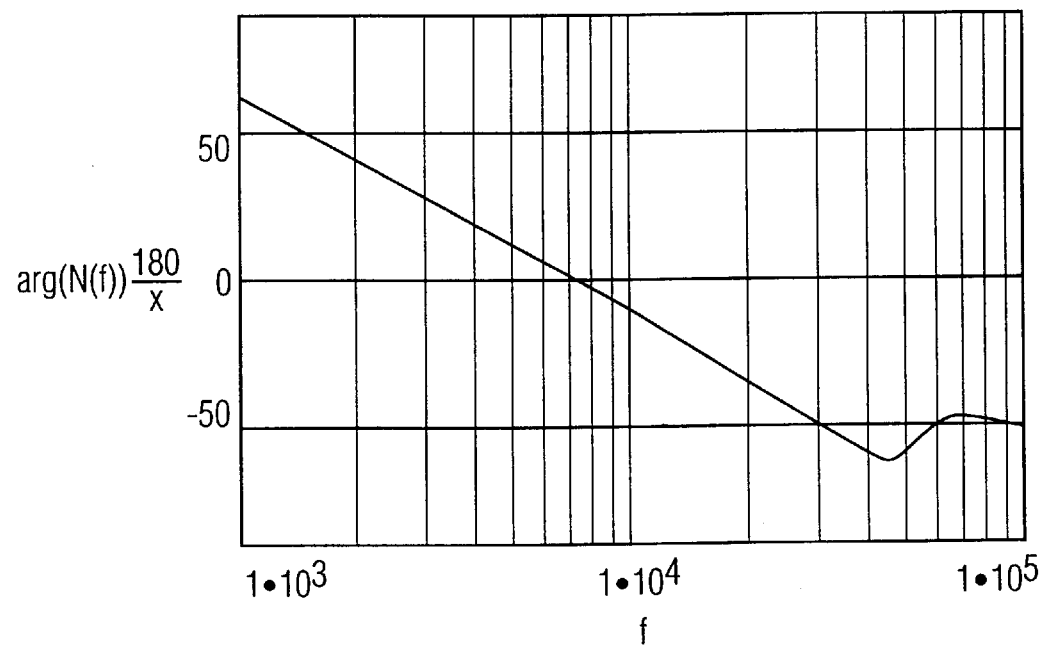
FIG. 8 is a graph of phase versus frequency for the filter of FIG. 6.

For a filter of the FIG. 6 configuration having the values given in Table 1, phase angle and gain have only small variation over a frequency range from 30 kHz to 100 kHz. Over the critical frequency range from 42 to 70 kHz, gain varies only by approximately 3 dB (FIG. 7), while phase shift varies over a range of about 65° to 45°. Table 2 contains measured prototype performance of a converter using this filter, with nominal circuit values according to Table 1. Most notably, when operated with all 4 lamps, or only 1 lamp, the output voltage is almost the same.

TABLE 1

| C1 | 3.3 µf | C64 | 330 pf |
|---|---|---|---|
| C2 | 47 µf | C65 | 1 nf |
| C3 | 1.2 µf | C66 | 3.3 nf |
| C4 | 12 nf | | |
| C5 | 0.1 µf | | |
| C6–9 | 1.2 nf | | |
| C61 | 8.2 nf | | |
| C63 | 2.2 nf | | |
| L2 | 366 µh | | |
| L66 | 3 mh | | |
| R1 | 1 MΩ | | |
| R2 | 18 Ω | | |
| R61 | 7.5 kΩ | | |
| R62 | 1.3 kΩ | | |
| R63 | 360 Ω | | |
| R65 | 1.3 kΩ | | |
| R66 | 3.6 kΩ | | |
| R67 | 390 Ω | | |

TABLE 2

| Lamp number m | 1 | 2 | 3 | 4 |
|---|---|---|---|---|
| Frequency f (kHz) | 70 | 56 | 47 | 43 |
| Output voltage (rms) | 588.7 | 542.3 | 594.3 | 580.8 |

Figure 9:
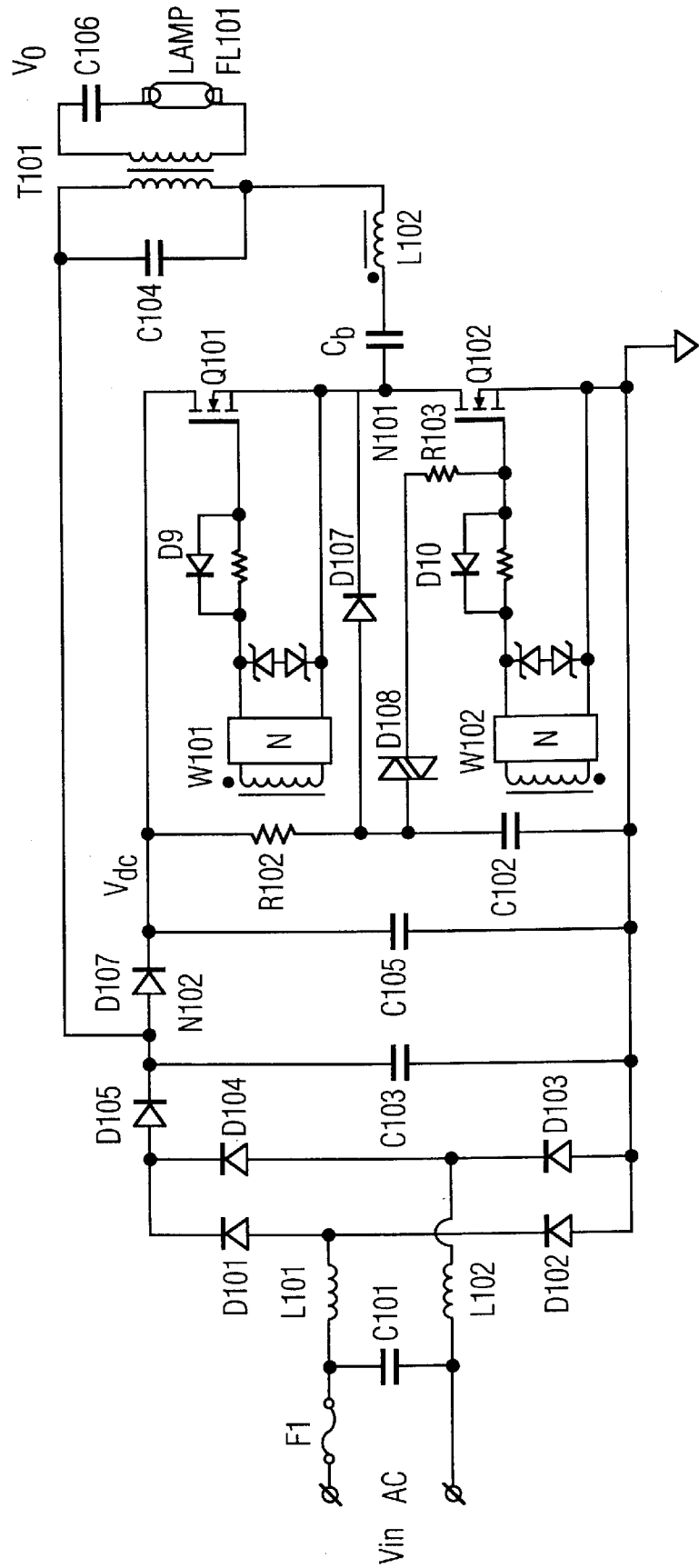
FIG. 9 is a schematic diagram of a converter embodying the invention for a single lamp.

Another embodiment of the invention, based on a single stage electronic ballast using the power feedback principle described in U.S. Pat. Nos. 5,410,221 to C. Mattas and J. Bergervoet, and in U.S. Pat. No. 5,404,082 to A. Hernandez and G. Bruning, is shown in FIG. 9. Known ballasts of this type have high power factor and low line current harmonic distortion, yet have a low parts count and are relatively inexpensive to manufacture. According to the invention, the inverter control circuit can be further simplified, with reduced parts count and improved reliability, by incorporating a regulator using a bandpass filter between control windings on the inductor and the switching transistors.

The circuit shown in FIG. 9 differs from that of U.S. Pat. No. 5,410,221 in that the control signals for switching the switching transistors are obtained via a vastly simplified control circuitry. Like the embodiment of FIG. 2, a resonance inductor L102 is a transformer having control windings W101 and W102 which provide signals proportional to the voltage across the inductor. Identical linear passive bandpass filters N are connected between the control windings and respective gates of the inverter.

More particularly, the circuit of FIG. 9 includes an EMI filter in the AC supply line, formed by series inductances L101 and L102 and shunt capacitor C101, to a full wave bridge rectifier formed by diodes D101–D104. In accordance with the power feedback principle, the converter load is connected between a first node N101 between switching transistors Q101 and Q102, and a second node N102 which receives DC voltage from the rectifier output through a high frequency diode D105. The converter load is connected to the node 101 via a DC blocking capacitor Cb, which is in series with the resonance inductor L102 and a resonance capacitor C104. A lamp FL101 is connected in series with a capacitor C106, this series combination being connected to the secondary of a step-up isolation transformer T101 whose primary is connected across the resonance capacitor C104.

The node 102 is connected to the DC bus for the switching transistors via another high frequency diode D107. A further path for the high frequency current from the load is provided by a capacitor C103 from node 102 to ground, and DC filtering is provided by a capacitor C105 from the DC bus to ground.

Figure 10:
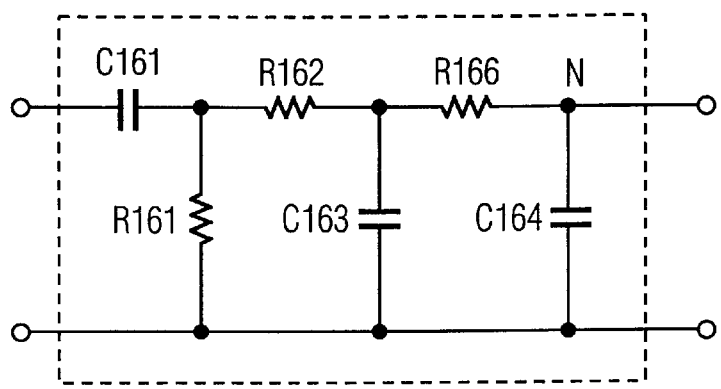
FIG. 10 is a schematic diagram of a filter useful in the embodiment of FIG. 9.

In accordance with the invention, the switching signals to gates of the switching transistors Q101 and Q102 are provided by respective passive bandpass filters N, shown in FIG. 10. The filter has a configuration analogous to that of FIG. 6, but is simplified by elimination of the inductor in the series path, and the use of only 6 components. The actual values of desired phase shift are a function of the other converter parameters. In general, because the voltage at node N102 is modulated by the input line sinusoidal voltage with low frequency, for example, 50 Hz or 60 Hz, the resonant tank input voltage between nodes N102 and N101 are also modulated by such low frequency. In order to reduce the lamp current crest factor and lamp power variation, the circuit operating frequency should be properly modulated such that an almost constant voltage is maintained across the lamp. The key function of the network N shown in FIG. 10 is to produce proper phase shift over the circuit operating frequency modulation range such that the lamp voltage has small variation during each low frequency cycle.

Figure 11:
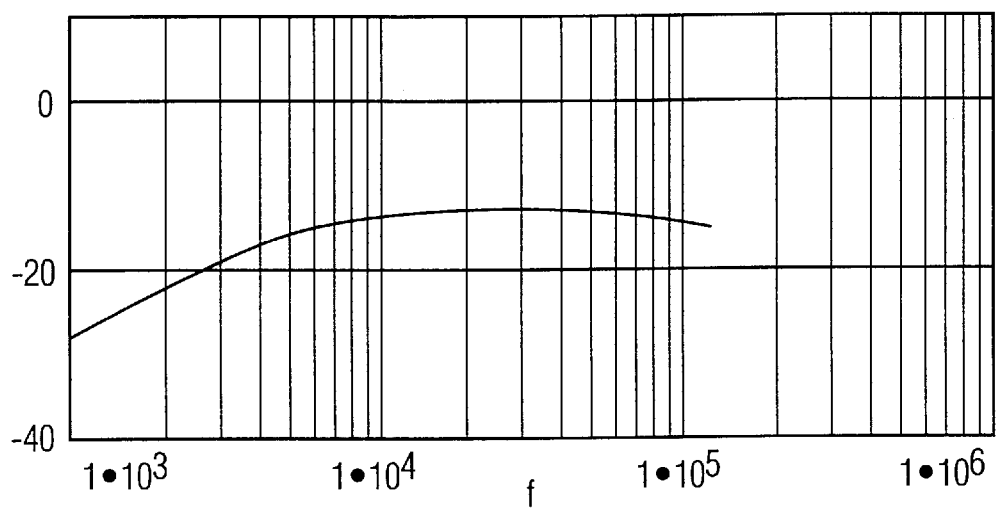
FIG. 11 is a graph of gain versus frequency for the filter of FIG. 10.
Figure 12:
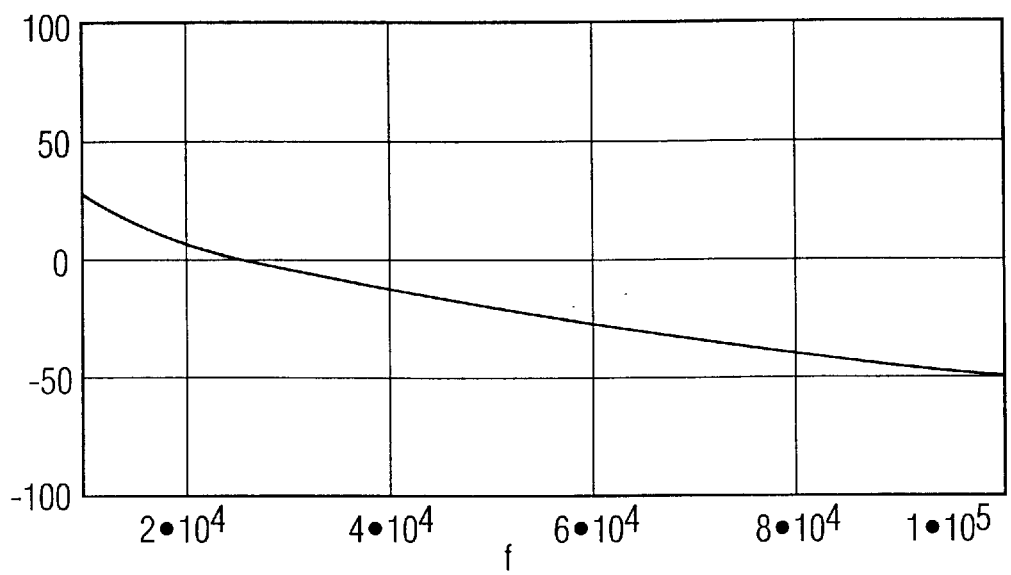
FIG. 12 is a graph of phase versus frequency for the filter of FIG. 10.

In one specific simple implementation, one may anticipate that desirable values will be between 10° lagging and 60° lagging over a range of approximately 2:1 in frequency, and that the phase shift should be within 15° of its median value over that frequency range. An example of gain and phase characteristics of suitable filters is shown in FIGS. 11 and 12, based on circuit values shown in Table 3. Over the range of 40 to 80 kHz the phase shift varies from approximately 12° lagging to approximately 38° lagging.

As in the filter of FIG. 6, the filter of FIG. 10 may be viewed as having a capacitor input T section followed by a π section. Over the operating frequency range of the converter, the T section has an approximately constant gain, with a leading phase angle which diminishes as frequency rises.

It may be noted that the circuit of FIG. 9 does not contain a separate lamp ignition circuit. Reliable striking of the lamp is provided by the high step-up ratio of transformer T101, which has a nominal output voltage of 550 volts when the frequency is approximately 63 kHz with the lamp lit. A converter according to this design has shown a total harmonic distortion in line current less than 15%, with power factor greater than 0.99. The lamp crest factor was less than 1.7.

TABLE 3

| C101 | 68 nf   | L101 | 650 µh  |
|------|---------|------|---------|
| C102 | 120 nf  | R102 | 1.0 MΩ  |
| C103 | 270 nf  | R103 | 18 Ω    |
| C104 | 28 nf   | R161 | 5.6 kΩ  |
| C105 | 180 µf  | R162 | 1.1 kΩ  |
| C161 | 1.2 nf  | R166 | 910 Ω   |
| C163 | 2.2 nf  |      |         |
| C164 | 1.0 nf  |      |         |

The embodiment of FIG. 9 also includes many circuit elements whose function will be recognized by those of ordinary skill, which are not critical to the practice of the invention. For example, an inverter starting circuit includes resistor R102 connected to the DC bus, and in series with capacitor C102 which in turn is connected to ground. From the junction of R102 and C102, a diode D107 is connected to node N101 and a diac D108 is connected via a resistor R103 to the gate of transistor Q102. Diodes D9 and D10, and the resistors in parallel with them, are not critical to the invention, but have the well-known function of causing the switching transistor turn-off to be faster than the turn-on.

It will be clear to those of ordinary skill that different choices of lamp operating frequency, resonance circuit values, lamp power and starting characteristics, will require changes in many of the other circuit element values. Filter circuits of the same configuration but with different component values may be preferred, or the filter configuration may be modified to meet application requirements. These variations are within the inventive concept and spirit as described above and in the appended claims.

What is claimed is:

1. A self-oscillating resonant converter for at least one discharge lamp which forms part of a load circuit, comprising a half-bridge inverter including two switching transistors and an output node between said transistors, and a linear core transformer including a load winding connected between the output node and the load circuit such that load current passes through the load winding, and at least one control winding for controlling the switching transistors, characterized in that the converter further comprises means for varying the oscillating frequency so as to maintain output voltage constant, said means including a bandpass circuit connected between said at least one control winding and a control electrode of one of said switching transistors.

2. A converter as claimed in claim 1, characterized in that the transformer has two control windings, and the means for controlling comprises two bandpass circuits, each bandpass circuit being connected between a respective control winding and the control electrode of a respective switching transistor.

3. A converter as claimed in claim 2, wherein said load winding is a resonant inductor which is in series with a resonance capacitor in said load circuit.

4. A converter as claimed in claim 3, wherein the converter is a voltage-fed converter for operating a plurality of lamps, characterized in that each bandpass circuit is arranged to keep output voltage substantially constant independent of the number of said lamps connected.

5. A converter as claimed in claim 4, wherein each of said plurality of lamps is connected in series with a respective series capacitor, and
the converter operates at frequencies at which the respective voltage across each series capacitor is greater than the respective lamp voltage.

6. A converter as claimed in claim 5, wherein the voltage across each series combination of a discharge lamp and its respective series capacitor is greater than the starting voltage of the respective lamp.

7. A converter as claimed in claim 6, further comprising a step-up transformer having a primary winding connected in parallel with the resonance capacitor, and a secondary winding to which said plurality of discharge lamps and their respective series capacitors are connected in parallel.

8. A converter as claimed in claim 3, characterized in that each of said bandpass circuits is a passive network connected directly to the respective control winding, and comprises only elements which are substantially linear.

9. A converter as claimed in claim 8, characterized in that the converter frequency is modulated at a low frequency related to the frequency of the input line voltage, and each passive network consists of resistors and capacitors only, over the operating frequency modulation range of the converter the passive network having a variation of phase shift versus frequency such that the lamp voltage has only a small variation during each line voltage cycle.

10. A converter as claimed in claim 8, characterized in that said bandpass circuit comprises at least one π section having a series path and at least two shunt paths to signal ground, said π section including an inductive element, and said bandpass circuit having a substantially constant phase shift over a range of high frequencies.

11. A converter as claimed in claim 10, characterized in that the inductive element is part of a low-Q tank circuit in the series path of the bandpass circuit, and the bandpass circuit further comprises at least one capacitor in each of the shunt legs.

12. A converter as claimed in claim 10, characterized in that said bandpass circuit has a substantially constant phase shift over a range of high frequencies, said phase shift has a value between approximately 40° and approximately 60°, and said range of higher frequencies exceeds a ratio of 5:6.

13. A converter as claimed in claim 10 for operating at least two said discharge lamps, characterized in that said bandpass circuit has a substantially constant phase shift over a range of high frequencies, said phase shift is substantially constant within a range of approximately 10° and has a value between approximately 40° and approximately 60°, and said range of higher frequencies has a ratio of at least approximately 4:5.

14. A converter as claimed in claim 13, characterized in that the output voltage is constant within a total range of less than approximately 10°.

15. A converter as claimed in claim 10 for operating up to four said discharge lamps, characterized in that said bandpass circuit has a substantially constant phase shift over a range of high frequencies, said phase shift is substantially constant within a range of approximately 10° and has a value between approximately 40° and approximately 60°, and said range of higher frequencies has a ratio of approximately 3:5.

16. A converter as claimed in claim 15, characterized in that the output voltage is constant within a total range of less than approximately 10°.

17. A converter as claimed in claim 16, characterized in that said value is between approximately 45° and approximately 55°.

18. A converter as claimed in claim 8, characterized in that said converter is a single stage power feedback type converter, each passive network consisting of resistors and capacitors only, and having a phase shift which is between 10° lagging and 60° lagging over a range of 2:1 in frequency, the phase shift being constant within 15° of its median value over that frequency range.

19. A converter as claimed in claim 18, characterized in that said bandpass circuit comprises a capacitor input T section followed by a π section, over the operating frequency range of the converter the T section having an approximately constant gain, with a leading phase angle which diminishes as frequency rises.

20. A converter as claimed in claim 2 wherein each bandpass circuit comprises, in cascade, an input high-pass T section and a π section with a parallel LC resonant circuit in the series path thereof.

21. A converter as claimed in claim 2 wherein each bandpass circuit comprises, in cascade, an input high-pass T section including a series capacitor and a shunt resistor and a π section including a series resistor and first and second shunt path capacitors.

22. A converter as claimed in claim 2 for operating a plurality of discharge lamps with a bandpass circuit for each discharge lamp, wherein each bandpass circuit includes only passive linear circuit elements which are configured so as to maintain the output voltage approximately constant independent of the number of discharge lamps in operation at any given time.

23. A converter as claimed in claim 22 wherein each bandpass circuit includes a π section and the bandpass circuit has a relatively small variation of phase shift over a given range of high frequencies.

24. A converter as claimed in claim 23 wherein the variation of said bandpass circuit phase shift is between approximately 40° and approximately 60° over said given range of high frequencies.

25. A converter as claimed in claim 24 wherein said phase shift is approximately constant within a range of approximately 10°.

26. A converter as claimed in claim 2 wherein the bandpass circuit comprises a capacitor input T section followed by a π section with the T section having an approximately constant gain over the operating frequency range of the converter.

27. A converter as claimed in claim 2 wherein each of said two bandpass circuits is a passive network and the converter frequency is modulated at a low frequency related to the frequency of the input line voltage, and each passive network, over the operating frequency modulation range of the converter, has a variation of phase shift versus frequency such that the lamp voltage has only a small variation during each line voltage cycle.

* * * * *